Figure 1:
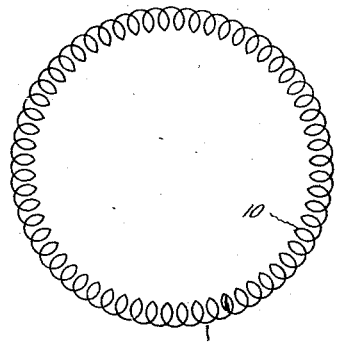
Figure 1:
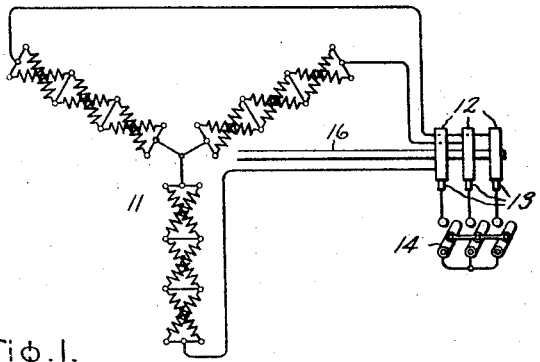

Sept. 1, 1925.  
C. MACMILLAN  
ASYNCHRONOUS MOTOR  
Filed April 12, 1924

1,552,386

Inventor:
Campbell Macmillan,
by
His Attorney.

Patented Sept. 1, 1925.

1,552,386

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ASYNCHRONOUS MOTOR.

Application filed April 12, 1924. Serial No. 706,200.

*To all whom it may concern:*

Be it known that I, CAMPBELL MACMILLAN, a citizen of the United States, residing at Schenectady, in the county of Schenectady, State of New York, have invented certain new and useful Improvements in Asynchronous Motors, of which the following is a specification.

My invention relates to alternating current dynamo electric machines, and in particular to the secondary members of asynchronous motors.

This application is a continuation in part of my copending application, Serial No. 566,552, filed June 7, 1922, entitled "Asynchronous motors", and assigned to the same assignee as the present application.

In my prior application above referred to, I have described a form of secondary winding for induction motors which gives the desirable starting torque and running efficiency of the form wound secondary type of induction motor, but without the necessity of providing the external starting resistance commonly used in such motors. The arrangement, which is particularly described and claimed in my prior application, consists of a form wound secondary provided with a short-circuiting device, the secondary being so arranged that with the short circuit removed relatively large currents are caused to flow in local low inductance, high resistance circuits in the secondary winding by reason of a resistance voltage difference existing in such circuits. This condition exists during the starting period and produces a high starting torque. When the motor comes up to speed the short circuiting device is closed and the secondary then functions, in general, like the usual short-circuited form wound secondary for efficient normal operation.

Another arrangement which was briefly described in my prior application makes use of a difference in phase instead of a difference in magnitude of the voltages induced in the conductors of the secondary which are connected in multiple for producing the high density and small effective current per slot during the starting period, the difference in phase being produced by arranging the multiple circuits so that they differ in phase by one or two rotor teeth. When the short circuit is closed for normal operation the phase difference will cause small equalizing currents to flow in the multiple circuits, but for the most part the multiple circuits now become parallel paths in series circuits of low resistance in general electrically similar to the circuits of the normal form wound secondary. It is the object of the present application to cover this last mentioned arrangement.

The features of my invention which I believe to be novel and patentable will be pointed out in the claims appended hereto. For a better understatnding of my invention reference is made in the following description to the accompanying drawing in which Fig. 1 illustrates a schematic diagram of the motor circuits arranged according to my invention, Fig. 2 shows in detail a portion of the secondary circuits of one embodiment of my invention, and Fig. 3 shows a centrifugal switch which may be used in place of manually operated switch in changing the rotor from the starting to the running connection.

Referring now to Fig. 1, 10 represents the primary, which is preferably the stator member of the motor, and 11 represents the rotor windings, here shown connected in star with the outer points of the star connected to slip rings 12. Stationary brushes 13 cooperate with the slip rings and connect the same to a manually operated short circuiting switch 14.

Figure 3:
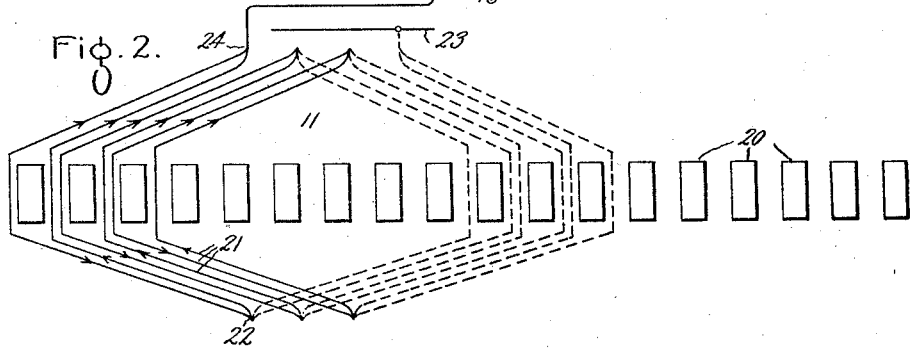
Figure 3:
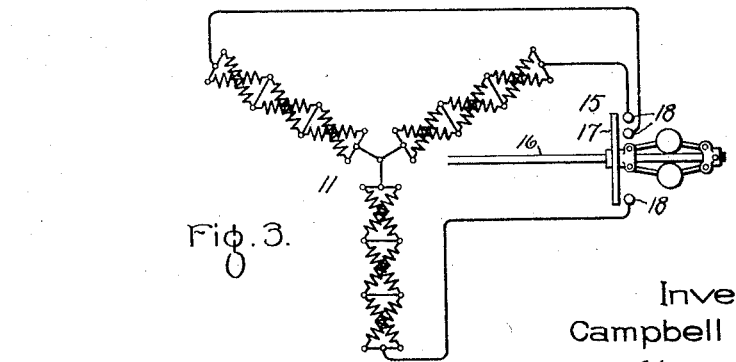

As represented in Fig. 3, the manually operated short-circuiting device shown in Fig. 1 may be replaced by an automatic switch 15 designed to be operated by centrifugal action and the slip rings of Fig. 1 may be omitted. In Fig. 3 the right-hand end of the centrifugal device, which is represented as the fly-ball governor type, is fixed to the rotor shaft 16, and the left-hand end carries a short-circuiting disc 17 which is free to slide on the shaft and which is arranged to be moved against the relatively stationary contacts 18 when the rotor comes up to speed, thereby short-circuiting the rotor circuits.

Figure 2:
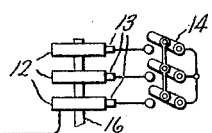

In Fig. 2, 20 represents the rotor teeth which for the sake of simplicity may be considered as laid out flat. For the purpose of explaining my invention the rotor will be considered as having 2 poles with 9 slots and teeth per pole and 4 bars per slot.

For the sake of clearness only one phase of the secondary barrel type winding is shown. By barrel type winding I mean a double layer winding made up of similar coils. Each phase of the secondary winding is made up of coils 21 having multiple circuits which differ in phase by one tooth at each end of the coil. The end conductors of each such coil are electrically connected together, as at 22, in any suitable manner. The phase belts may have as many turns as desired, three being represented in the present embodiment. The conductors shown in full lines are for the top coils and those shown in dotted lines are for the bottom coils of the slots. One end of each phase belt is connected to the star point 23 and the other end 24 is connected to a slip ring.

It will now be evident that, with the slip rings open and the stator energized, currents will circulate in the short-circuits formed around each tooth in the manner indicated by the arrows in the lower end connections by reason of the rotating magnetic field cutting such teeth. The effective current per slot is, however, normal because of the small phase difference of the large currents which flow in opposite directions in the side by side conductors contained in the slots. Furthermore, the currents flowing in the parallel and adjacent end connections of the various multiple circuits are equal and opposite so that a high resistance, low inductance starting connection is obtained.

When the short circuit is closed at the slip rings, or by the centrifugal device of Fig. 3, after the rotor has come up to speed the circuits which formed the short-circuited paths during the starting period now form parallel paths of a much lower resistance in series with the remaining parallel paths of the phase belt and the currents now flow as indicated by the arrows in the upper end connections. The closing of the short circuiting device nearly connects the coils of the secondary in a polyphase series short circuit. Equalizing currents will still flow around the teeth, but these circulating currents are now very small and do not affect the efficiency of the motor since they merely serve to restore that current distribution which is associated with minimum loss.

In accordance with the provisions of the patent statutes, I have described the principle of operation of my invention together with the apparatus which I now consider to represent the best embodiment thereof, but I desire to have it understood that the apparatus shown is only illustrative and that the invention can be carried out by other arrangements.

What I claim as new and desire to secure by Letters Patent of the United States, is:

1. A secondary member for asynchronous machines comprising a slotted core member provided with a barrel winding made up of a plurality of coils having permanently connected multiple circuits between the opposite ends of the core and with the conductors which are thus connected in multiple laid in adjacent slots thereby forming local series short-circuits around the teeth.

2. A secondary member for asynchronous machines comprising a slotted core member provided with a barrel winding made up of a plurality of coils having permanently connected multiple circuits forming local short-circuits around individual teeth in the core, and switching means for connecting all of said coils in a series polyphase short-circuit.

3. A secondary member for asynchronous machines comprising a slotted core member provided with a polyphase winding of the barrel type made up of coils having permanently connected multiple circuits forming local short-circuits around individual teeth of the core, the adjacent coils of a phase belt having side by side conductors in the same slot, and switching means for connecting the coils in series in a polyphase short-circuit.

4. An asynchronous motor comprising a primary member and a slotted core secondary member having a coil winding system provided with a plurality of groups of multiple circuits, and switching means for connecting the secondary coils in a series short-circuit for normal operations, the conductors of each multiple circuit being just sufficiently separated on the secondary core as to cause relatively large currents to circulate in such circuits when the switching means is open for starting the motor, but not sufficiently separated as to appreciably interfere with the parallel flow of the current in said circuits when the switching means is closed for normal operations.

5. An asynchronous motor comprising cooperating primary and secondary members, the secondary member having a slotted core and form wound coils arranged to be short-circuited for normal operation, characterized by the fact that the secondary coils have a plurality of multiple circuits forming closed circuits around individual teeth in the secondary.

In witness whereof, I have hereunto set my hand this 11th day of April 1924.

CAMPBELL MACMILLAN.